May 27, 1958
A. R. HILSINGER
2,835,945
ELASTIC MEANS FOR ATTACHING THE ENDS OF A
FLEXIBLE MEMBER TO A SPECTACLE FRAME
Filed April 29, 1957
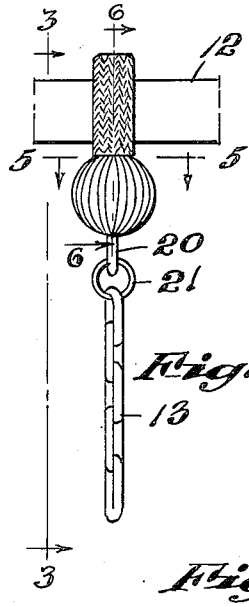
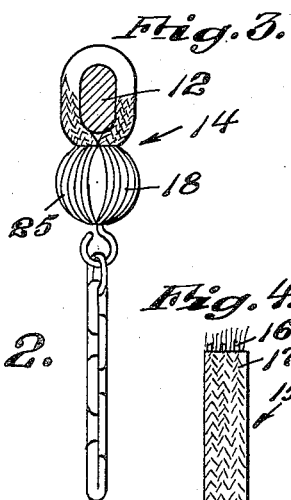
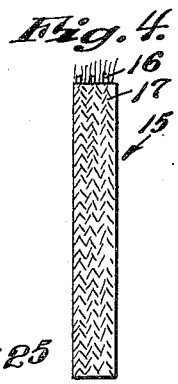
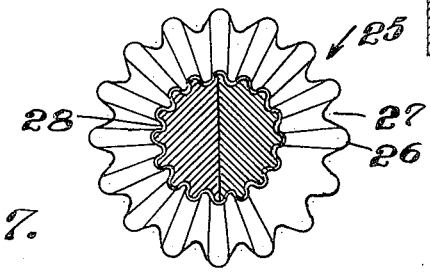
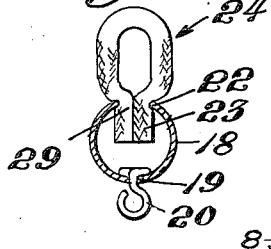
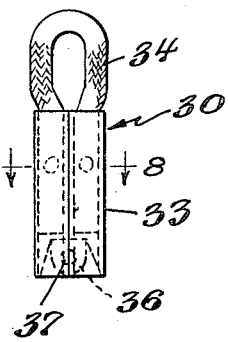
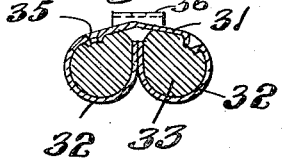
INVENTOR.
Arthur R. Hilsinger
BY
Barlow & Barlow
ATTORNEYS.

United States Patent Office 2,835,945
Patented May 27, 1958

2,835,945

ELASTIC MEANS FOR ATTACHING THE ENDS OF A FLEXIBLE MEMBER TO A SPECTACLE FRAME

Arthur R. Hilsinger, Mount Tabor, N. J., assignor to The Hilsinger Corporation, a corporation of Massachusetts Application April 29, 1957, Serial No. 655,716

2 Claims. (Cl. 24—3)

This invention relates to means for attaching the opposite ends of a flexible member to a spectacle temple so that the ophthalmic mounting will not blow off or drop from the face of the wearer and become lost or damaged.

Heretofore a chain or some flexible member has been secured to spectacle temples and passed about the neck of the wearer of the spectacles, the attachment to the temples being made by some sort of clip which will snap over the temples. A clip often causes scratching of the temples, and if the temples and clips are not the correct size, either difficulty of attachment occurs or an insecure attachment exists.

One of the objects of this invention is to provide a simple device which may be easily secured to the temples at any point along their length and which will be sufficiently adjustable to accommodate all sizes of temples.

Another object of the invention is to provide an attachment to the temples which will be such that the temples will not become scratched or damaged.

Another object of the invention is to provide a device which will securely hold a flexible member to the temples.

Another object of the invention is to provide an arrangement which will have some elasticity for the better gripping of the temples.

With these and other objects in view, the invention consists of certain novel features of construction as will be more fully described and particularly pointed out in the appended claims.

In the accompanying drawings:

Fig. 1 is a face view illustrating the flexible member of this invention attached to the temples of sunglasses and positioned about the neck of the user;

Fig. 2 is a fragmental view showing on an enlarged scale an end portion of the flexible member attached to a fragmental portion of a spectacle temple;

Fig. 3 is a sectional view on line 3—3 of Fig. 2;

Fig. 4 is a fragmental view of the non-metallic strand from which the loop is formed;

Fig. 5 is a sectional view on substantially line 5—5 of Fig. 2;

Fig. 6 is a sectional view on substantially line 6—6 of Fig. 2;

Fig. 7 is an elevation of a modified form of loop and holding member; and

Fig. 8 is a sectional view on line 8—8 of Fig. 7.

In proceeding with this invention, I provide a metallic holding member into which the ends of a non-metallic loop, usually formed of rubber core with a textile sheath covering it, are positioned with the metallic member squeezed in to tightly grip the ends of the loop. The loop is so sized that by an elastic expansion of the loop it may be slipped over the temple of a spectacle so that, upon contraction, it will grip the temple and thus be secured in place. In order that there may be a firm grip on the end portions of the non-metallic loop, the gripping portion of the metallic holding member is modified to obtain a better grip so as to firmly hold the covered elastic loop in position.

With reference to the drawings, 10 designates generally a person who has a sunglass frame 11 on the face with temples extending rearwardly from the frame, one of which temples is designated 12 and shown in Fig. 2. The flexible member in this illustration is a chain 13, the ends of which it is desired should be attached to each of the temples 12 which extend from the frame 11.

The attachment above referred to is provided as shown in Figs. 1 and 6 by the device which is designated generally 14 and comprises two parts.

One part comprises a length of non-metallic elastic material designated generally 15 having strands of rubber or synthetic rubber 16 about which there is provided a textile sheath 17 which may be cotton yarn or yarns of other material. This sheath may be formed by braiding the yarns about the core or by other covering means such, for instance, as helically winding yarns about a core in either one or in two opposite directions. I, however, believe that the braided sheath has some superior qualities in that it provides a better gripping surface for the loop to grab and hold upon the temple upon which it is positioned in the carrying out of this invention.

The other part of my securing device 14 comprises a hollow member 18 which, in this instance, is in the form of a ball having an opening at its bottom at 19 through which a metal eye 20 is positioned for attachment to the chain 13 by means of a ring 21, while at its top there is an opening 22 into which the ends 23 of the non-metallic elastic member are positioned so as to provide a loop 24 which is closed by means of the ends extending into the hollow ball 18. The ball is corrugated as at 25 with ribs 26 and depressions 27 (see Fig. 5) which provides a serrated or wavy edge 28 and a better gripping edge for the loop 24 than would be provided by a smooth edge. This wavy edge also provides an arrangement by which the edge of the ball into which the loop ends protrude may be more easily closed by pressure to cause this edge to grip the loop ends as seen at 29 in Fig. 6, and close and bind the loop in position.

The elasticity and size of the loop is such that it may be enlarged sufficiently to extend over the usually enlarged end of a temple and also such that, upon contraction, it will grip the temple as shown in Fig. 3 and securely hold an end of the flexible member 13 on the temple. Both ends of the flexible member 13 are similarly equipped for the purpose of holding the spectacle in position.

In some cases, instead of providing a metallic ball which has been designated 18, I may provide a metallic member 30 (Fig. 7) which comprises a sheet metal body portion 31 with two rolled cylindrical eyes 32 rolled inwardly toward each other against the body and along its length and into which the opposite ends 33 of an elastic non-metallic loop 34 may be positioned as shown in Figs. 7 and 8. In order to hold these end portions in position, the sheet stock of this member is forced inwardly to provide gripping prongs 35 to extend into the non-metallic material and hold it in place. The lower portion of the body or back of this holder 30 is shaped to provide an eye 36 with an opening 37 therein through which a ring 21 may pass to attach this holder to the flexible member 13.

I claim:

1. A removable spectacle retainer having means to detachably secure the ends of an elongated flexible member to temple bars of spectacles, each attachment means comprising an elastic loop of a size to frictionally engage a temple bar, both ends of said loop bound in a securing device, said device having a hollow general spherical body with at least one opening to the hollow thereof to receive the ends of said loop, said body having a corrugated surface with the corrugations extending on great circles of the body passing substantially through the center of said opening to form an undulated edge which grips the ends of said loop at an angle to the general extent thereof, said body having additional means to attach said flexible member thereto.

2. A retainer as in claim 1 wherein said body has two diametrically opposed openings therethrough, one of said openings grasping the loop and the other opening having hook means protruding therefrom for securing the flexible member thereto.

References Cited in the file of this patent

UNITED STATES PATENTS

| | | |
|---|---|---|
| 291,693 | Cole | Jan. 8, 1884 |
| 487,042 | Ziegler | Nov. 29, 1892 |
| 2,539,922 | Nyberg | Jan. 30, 1951 |